US006418423B1

(12) United States Patent
Kambhatla et al.

(10) Patent No.: US 6,418,423 B1
(45) Date of Patent: Jul. 9, 2002

(54) METHOD AND APPARATUS FOR EXECUTING NEURAL NETWORK APPLICATIONS ON A NETWORK OF EMBEDDED DEVICES

(75) Inventors: Nandakishore Kambhatla, Elmsford; Dimitri Kanevsky, Ossining; Wlodek Wlodzimierz Zadrozny, Tarrytown, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,939

(22) Filed: Jan. 29, 1999

(51) Int. Cl.⁷ .................................................. G06N 3/02

(52) U.S. Cl. ........................................... 706/15; 706/16

(58) Field of Search ........................ 706/15, 45; 702/34; 709/200

(56) References Cited

U.S. PATENT DOCUMENTS

| | | | | |
|---|---|---|---|---|
| 5,943,663 A | * | 8/1999 | Mouradian | 706/45 |
| 6,078,946 A | * | 6/2000 | Johnson | 709/200 |
| 6,199,018 B1 | * | 3/2001 | Quist et al. | 702/34 |

OTHER PUBLICATIONS

Aussem, A.; Mahul, A.; Marie, R., Queueing network modelling with distributed neural networks for serivce quality estimation in B–ISDN networks, Neural Networks, 2000. IJCNN 2000, Proceedings of the IEEE–INNS–ENNS International Joint Conference on, Volume.*

Murgu, A., Distributed neural control for Markov decision processes in hierarchic communication networks, Cellular Neural Networks and their Applications, 1994. CNNA–94., Proceedings of the Third IEEE International Workshop on, 1994, pp.: 291–296.*

Hiramatsu, A., Integration of ATM call admission control and link capacity control by distributed neural networks, Selected Areas in Communications, IEEE Journal on, vol.: 9 Issue: 7, Sep. 1991, pp.: 1131–1138.*

Introduction to the Theory of Neural Computation, John Herz, Anders Krogh and Richard G. Palmer, Addison Wesley Publishing Company, 1991.

Machine Learning, Chapter 4, Tom M. Mitchell, McGraw–Hill, 1997.

* cited by examiner

*Primary Examiner*—Tuan Q. Dam
*Assistant Examiner*—Wilbert L. Starks, Jr.
(74) *Attorney, Agent, or Firm*—Louis Percello; Harrington & Smith, LLP (57) ABSTRACT

Disclosed is a system and a method for combining the computational resources of numerous embedded devices to enable any of them to perform complex tasks like speech recognition or natural language understanding. A distinguished master device communicates with a network of embedded devices, and organizes them as the nodes of a neural network. To each node (embedded device) in the neural network, the master device sends the activation function for that node and the connectivity pattern for that node. The master device sends the inputs for the network to the distinguished input nodes of the network. During computation, each node computes the activation function of all of its inputs and sends its activation to all the nodes to which it needs to send output to. The outputs of the neural network are sent to the master device. Thus, the network of embedded devices can perform any computation (like speech recognition, natural language understanding, etc.) which can be mapped onto a neural network model.

20 Claims, 9 Drawing Sheets

OUTPUTS OF NETWORK, 270

INPUTS OF NETWORK, 220

FIG.4

THE MASTER DEVICE PROCESS 500
EXECUTING ON MASTER DEVICE 410

PERIODICALLY (E.G. EVERY FEW SECONDS OR MINUTES) ─ 501
EXECUTE THE FOLLOWING IN SEQUENCE:
1. EXECUTE "FIND AVAILABLE EMBEDDED DEVICES"
PROCESS 510
2. EXECUTE "MAP EMBEDDED DEVICES TO NEURAL
NETWORK NODES" PROCESS 520
3. EXECUTE "START NEURAL NETWORK ON EMBEDDED
DEVICES" PROCESS 530

EXECUTE A "COLLECT NEURAL NETWORK OUTPUT" ─ 550
PROCESS 550

"START NEURAL NETWORK ON EMBEDDED DEVICES"
PROCESS 530 ON MASTER DEVICE

MASTER DEVICE 410 SENDS THE WEIGHTS 280 LOCAL CONNECTIVITY PATTERNS AND THE ACTIVATION FUNCTIONS 230 FOR EACH NODE 210 TO THE CORRESPONDING SLAVE EMBEDDED DEVICE 420.

MASTER DEVICE 410 SENDS THE INPUTS OF THE NEURAL NETWORK 220 TO THE EMBEDDED DEVICES EXECUTING THE COMPUTATION FOR THE INPUT NODES 250 OF THE NEURAL NETWORK.

FIG.5c

"COLLECT NEURAL NETWORK OUTPUT" PROCESS 550

WAIT FOR "COMPUTATION DONE" EVENT FROM ALL THE EMBEDDED DEVICES 100 EXECUTING THE COMPUTATION OF THE OUTPUT NODES OF THE NEURAL NETWORK 260

RETRIEVE THE OUTPUT OF THE NEURAL NETWORK 270 FROM THE EMBEDDED DEVICES 100 EXECUTING THE COMPUTATION OF THE OUTPUT NODES OF THE NEURAL NETWORK 260.

PROCESS THE NEURAL NETWORK 270 AS PER THE APPLICATION.

METHOD AND APPARATUS FOR EXECUTING NEURAL NETWORK APPLICATIONS ON A NETWORK OF EMBEDDED DEVICES

FIELD OF THE INVENTION

The present invention generally relates to embedded devices and, more particularly, to a method and apparatus for executing neural network applications on a network of embedded devices.

DESCRIPTION OF PRIOR ART

An embedded device 100 is a portable device with an embedded electronic chip (which we call a central processing unit or CPU 120) and memory 130 which enable it to perform digital computations and communicate with other computers and embedded devices. Such devices are becoming endemic. Examples include digital cellular telephones, hand-held devices like the Palm Pilot, digital watch, calculator, pen, and even household appliances like television sets, radio sets, toasters, microwaves etc. Embedded devices can communicate with each other using telephone or cable wires, or cellular wireless communication.

The embedded chips in embedded devices have relatively small processing power, which is insufficient to solve complex tasks like recognizing speech phonemes or natural language understanding, etc. Currently, the processing of such complex tasks requires the use of non-embedded devices with sufficient computation resources (e.g. desktop computers, laptops etc.).

Figure 1:
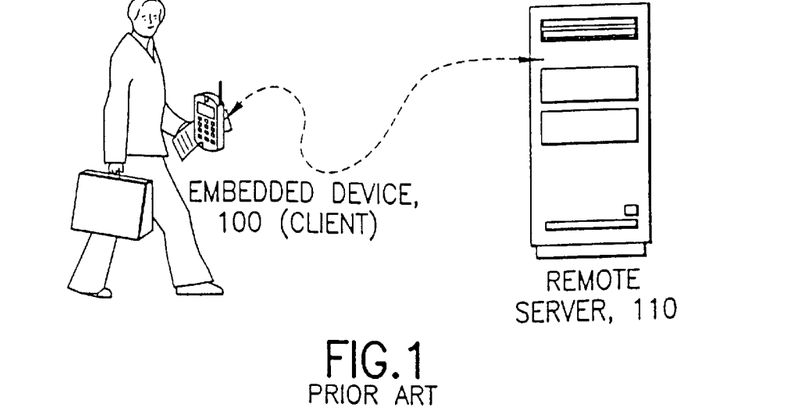
FIG. 1 is diagram showing a prior art client server mechanism for executing applications on a remote server through client embedded devices.

One approach to enabling complex computation through embedded devices is to use a client server interface in which client programs executing in embedded devices communicate (wirelessly) with a remote server on a workstation. FIG. 1 shows an embedded device 100 (cellular phone) communicating to a remote server 110 (a mainframe computer) using cellular wireless technology. Using the setup shown in FIG. 1, the cellular phone can execute complex applications. However, bandwidth limitations on typical current wireless communication channels severely limit the utility of this approach.

There are other disadvantages of much of this prior art. For example, often there is a lack of fault tolerance and a lack of speedy execution. The prior art often cannot recover from a cell phone going out of range and cannot take advantage of more cooperative cell phones coming into range. Also bandwidth limitations cause slow computation.

Another approach to enabling complex computation on embedded devices is to perform parallel distributed processing on distributed representations of task input. Neural networks are an eminently suitable mechanism for achieving this. This approach has the advantage of increased fault-tolerance and can make use of newly available embedded devices. Failure of some device does not fatally impair overall computation. Also, there is a much speedier execution of target application even on devices with low compute power and limited bandwidth.

Figure 2:
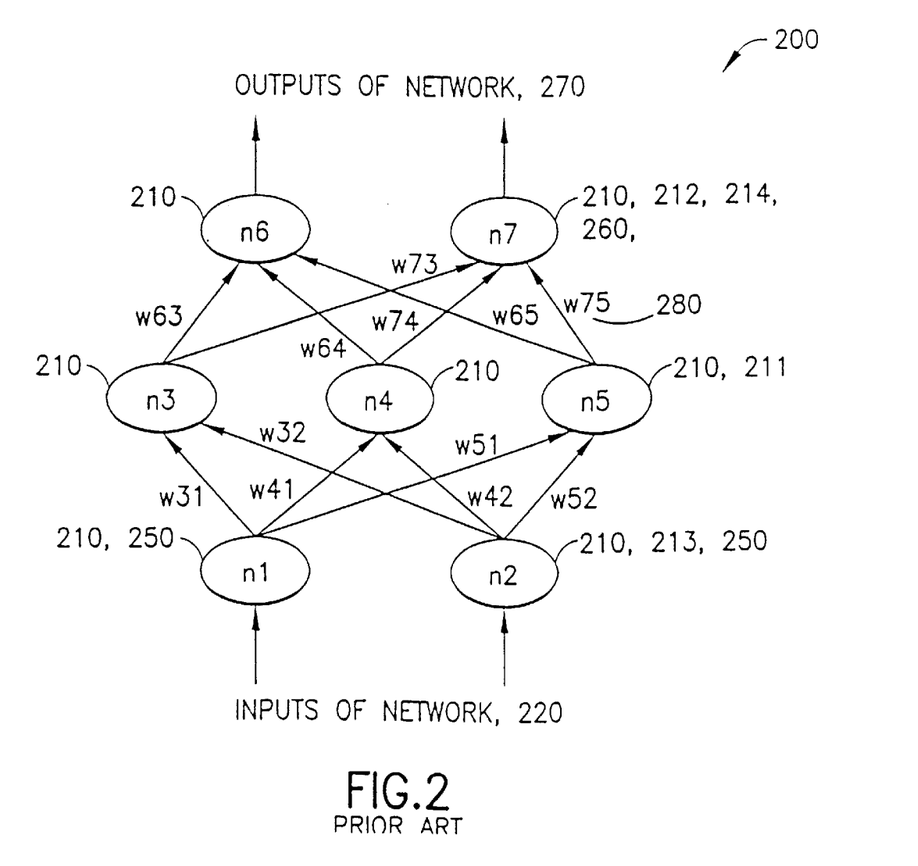
FIG. 2 is a diagram of a prior art neural network with two input nodes and two output nodes.

FIG. 2 shows a feedforward neural network. A feedforward neural network 200 is a network of simple processing units, called "nodes" 210, each of which computes an activation function 230 of all the inputs received by it and sends the result of the computation, called the "activation" 240 to some other nodes. Designated input nodes 250 do not perform any computation and simply send the inputs received by them (the inputs to the neural network 220) to their connecting nodes. The activation 240 at designated output nodes 260 is the "output" 270 of the neural network. Each connection between two nodes is directed. For example, n5 is the starting node 211 and n7 is the ending node 212 for the connection w75 which is the "weight", typically 280, attached to it. This weight 280 is used in the computation of the activation function 230 (FIG. 3 below) at the ending node 212 of the connection. We refer to all the starting nodes of connections feeding into a node as the 'incoming nodes' (typically 213) for that node. Similarly, we refer to all the ending nodes of connections feeding out of a node as the 'outgoing nodes' (typically 214) for that node. To continue the example, all nodes feeding node n5, i.e. nodes n1 and n2, are incoming nodes 213 for n5 and all nodes receiving information from n5, e.g. nodes n6 and n7 are outgoing nodes 214 of node n5. The pattern of connectivity of the nodes, the weights associated with connections, and the specific function computation at each node determine the output 270 of the neural network.

Neural networks 200 are usually implemented as software simulations of the networks. Neural networks are widely applied to statistical pattern classification, regression and time series analysis tasks. In most applications, the inputs to the neural network represent mathematical representations of task related experience, which are used to learn the weights 280 of the connections, such that the correct output can be predicted with minimal error.

Figure 3:
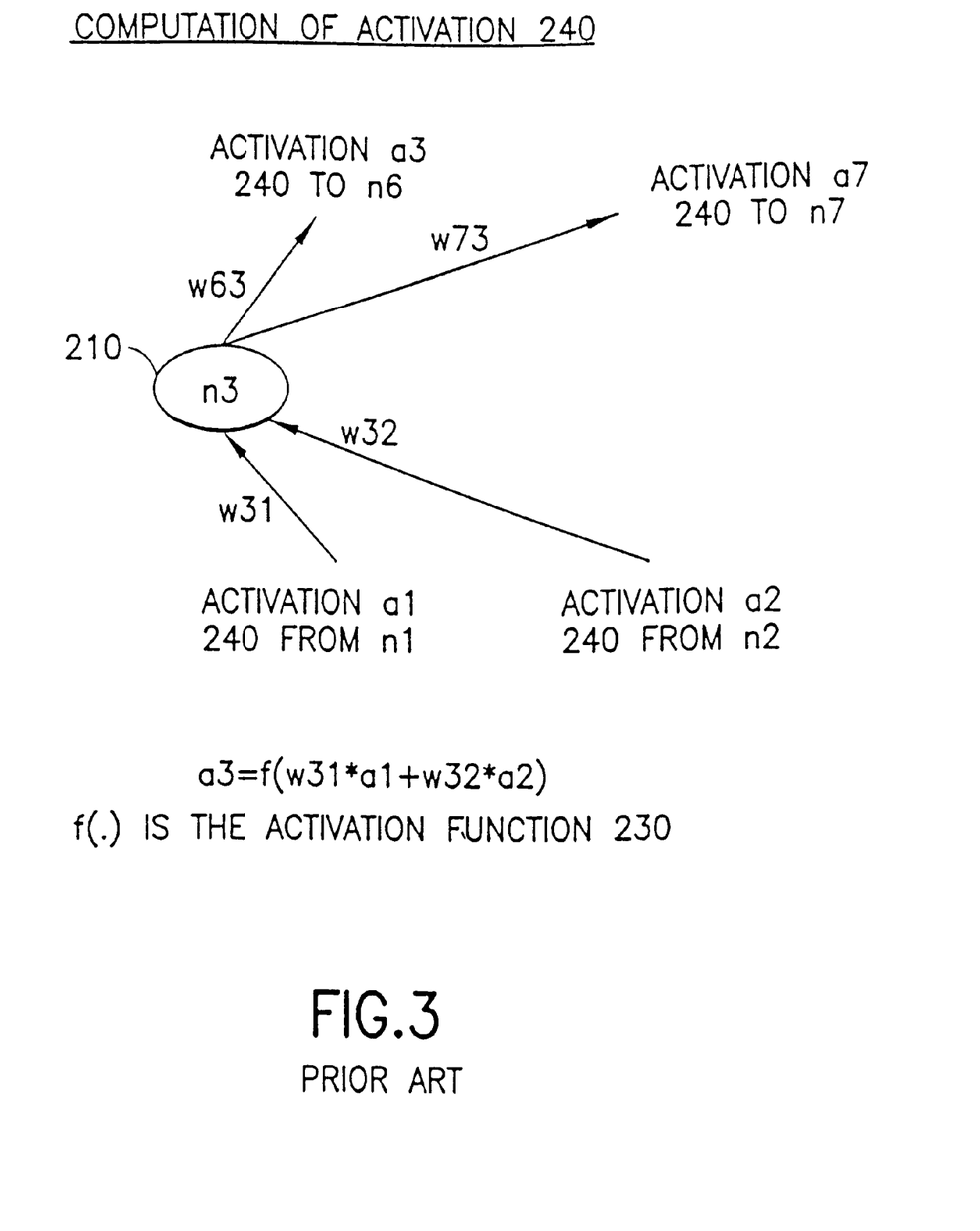
FIG. 3 is a diagram of a prior art single node (embedded device) of the neural network in FIG. 2, its inputs and outputs, and its activation function.

FIG. 2 shows a three layered feedforward neural network 200, where n1, n2, n3, n4, n5, n6 and n7 are the nodes 210 and w31, w32, w41, w42, w51, w52, w63, w64, w65, w73, w74 and w75 are the weights 280 of the connections between the nodes. Nodes n1 and n2 are the designated input nodes 250 of the network. Nodes n3, n4, and n5 receive inputs from nodes n1 and n2. Nodes n6 and n7 are the designated output nodes 260 which receive inputs from nodes n3, n4, and n5. Nodes n3, n4, n5, n6 and n7 compute an activation function 230 which is a weighted sum of their inputs from other nodes as shown in FIG. 3. The result of computations (activations 240) of nodes n3, n4, and n5 are sent to nodes n6 and n7. The activations 240 of nodes n6 and n7 represent the output 270 of the neural network. In this example, the inputs 220 to the network (i.e. inputs to nodes n1 and n2) might represent two parameters (e.g. pitch and fundamental frequency) from which the gender of a speaker needs to be determined. In such a scenario, the outputs of nodes n6 and n7 might represent the two genders male and female. The actual classification is achieved by comparing the numerical values of the activations of the nodes n6 and n7 and assigning the gender corresponding to the node with the greater numeric value. The weights 280 of the network are learned by presenting the network with several examples of (pitch, frequency, gender) triplets and "training" the network. There are a number of well known neural network training algorithms.

OBJECTS OF THE INVENTION

It is an object of the present invention to provide a method and a system for combining the computational resources in embedded devices for executing neural network based applications.

It is yet another object of this invention to provide a method and a system for representing each embedded device as a node in a neural network that communicates with other nodes (embedded chips) for executing neural network based applications.

SUMMARY OF THE INVENTION

This invention is directed towards a system and a method for combining the computational resources of numerous embedded devices to enable any of them to perform complex tasks like speech recognition or natural language understanding. A distinguished master device communicates with a network of embedded devices, and organizes them as the nodes of a neural network. To each node (embedded device) in the neural network, the master device sends the activation function for that node and the connectivity pattern for that node. The master device sends the inputs for the network to the distinguished input nodes of the network. During computation, each node computes the activation function of all of its inputs and sends its activation to all the nodes to which it needs to send output to. The outputs of the neural network are sent to the master device. Thus, the network of embedded devices can perform any computation (like speech recognition, natural language understanding, etc.) which can be mapped onto a neural network model.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a flowchart showing the 'Master Device Process' used by a distinguished master device to facilitate the neural network computation.

DETAILED DESCRIPTION OF A PREFERRED EMBODIMENT OF THE INVENTION

Figure 4:
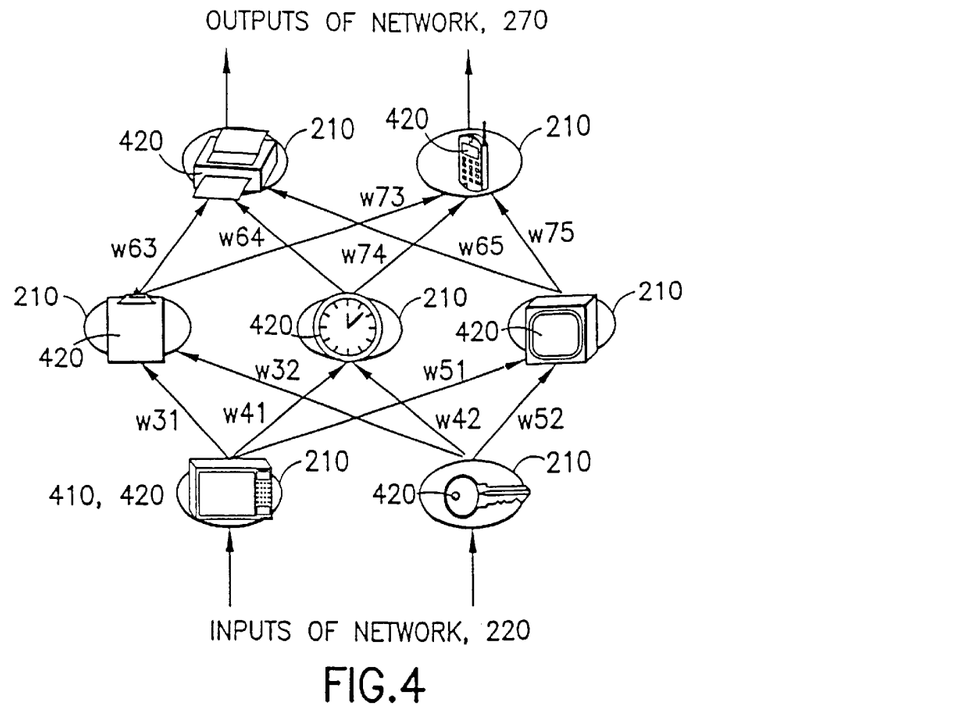
FIG. 4 is a diagram of neural network where embedded devices perform the functions of nodes of the network.

FIG. 4 shows a diagram of a feedforward neural network 200 where each node 210 of the network is an embedded device 100. In particular, there is a distinguished Master Device 410 and several Slave Devices 420 (all the other embedded devices). The Master Device 410 is simply the device which needs to and decides to start a networked computation. The Master Device 410 initiates the computation performed by the network using the Master Device Process 500 shown in FIGS. 5, 5(a), 5(b), 5(c) and 5(d). In our system, all embedded devices 100 which are potential candidates for participation in the networked computation are Slave Devices 420 and execute the algorithm described in FIGS. 6, 6(a), 6(b), 6(c), and 6(d). Note that the same embedded device might operate both as a Master Device 410 and as a slave device 420 (e.g. the microwave appliance in FIG. 4).

FIG. 5 shows the Master Device Process 500 executing on the embedded device 100 acting as the Master Device 410. The Master Device periodically (e.g. every few minutes or seconds in the preferred embodiment) executes the process 'Find Available Embedded Devices' 510 to find the embedded devices which are currently within communication range and are willing to participate in the neural network computation. After finding the available embedded devices, the master device 410 executes the 'Map Embedded Devices to Neural Network Nodes' 520 process which assigns the neural network nodes to the available embedded devices, and the 'Start Neural Network on Embedded Devices' 530 process to start the computation on all the embedded devices currently participating in the network. The Master Device 410 also starts a 'Collect Neural Network output' process 550 which gathers the output of the neural network 270 from the embedded devices which are executing the computation for the output nodes 260 of the neural network.

Figure 5A:
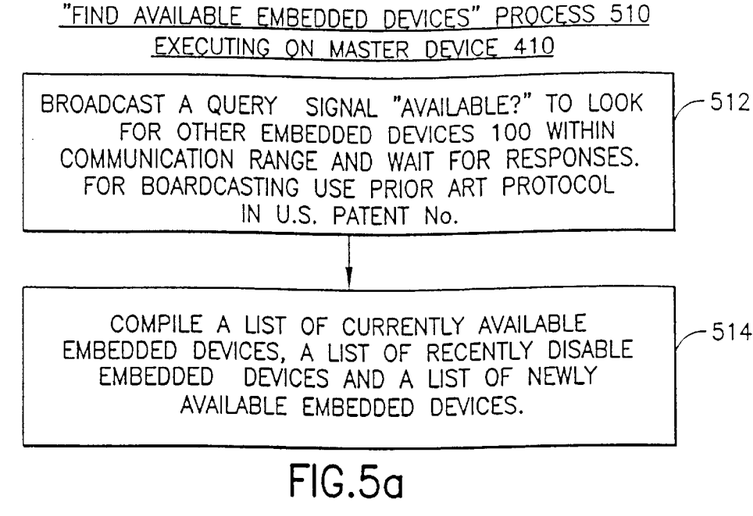
FIG. 5(a) is a flowchart showing the 'Find Available Embedded Devices' process executing on the Master Device.

FIG. 5(a) shows a flowchart for the 'Find Available Embedded Devices' process 510 which executes periodically on the Master Device 410. The Master Device broadcasts 512 a prearranged signal to all devices 100 within communication range (e.g. broadcasting a signal at a specific frequency using cellular wireless technology). The Master Device waits for an 'available' response from embedded devices and compiles a list 514 of available embedded devices, a list of previously available embedded devices which are no longer within communication range, and a list of embedded devices which are newly 'available'. Note that a lack of response from an embedded device classifies it as an 'unavailable' device which is out of communication range. Thus, a device which responds with a 'busy' response is classified in the 'available' list, but not in the newly available list, and a device which responds with an 'available' response is classified into both the newly available and the available lists.

Figure 5B:
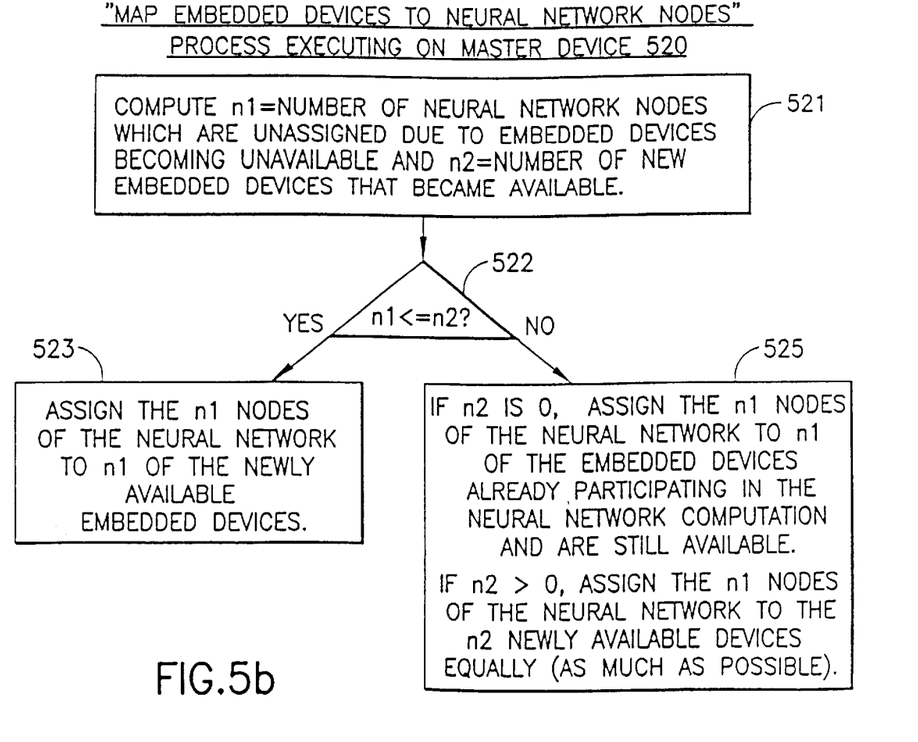
FIG. 5(b) is a flowchart showing the 'Map Embedded Devices to Neural Network nodes' process executing on the Master Device.

FIG. 5(b) shows a flowchart of the 'Map Embedded Devices to Neural Network Nodes' process 520 executing periodically on the Master Device 410. The Master Device computes n1, the number of neural network nodes which are currently unassigned to any embedded device (due to embedded devices becoming unavailable) and n2, the number of embedded devices that have newly become available. If n1<n2, the Master Device assigns the n1 nodes to n1 of the newly available Embedded Devices. If n2 is 0 (i.e. if there are no newly available embedded devices), the Master Device assigns the n1 nodes of the neural network to n1 of the embedded devices which are already participating in the neural network computation and are still within communication range. If n2>0 and n2<n1, the Master Device assigns the n1 nodes to the n2 newly available embedded devices as equally as possible. This is accomplished by use of well known balancing algorithms.

Figure 5C:
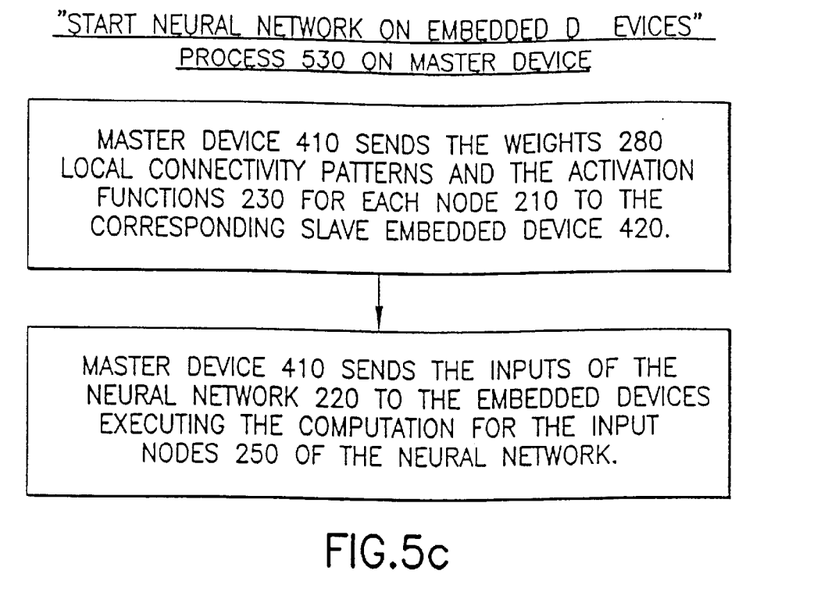
FIG. 5(c) is a flowchart showing the 'Start Neural Network on Embedded Devices' process executing on the Master Device.

FIG. 5(c) shows a flowchart for the 'Start Neural Network on Embedded Devices' process 530 executing periodically on the Master Device 410. By this time, all the nodes of the neural network have been assigned to different embedded devices. The Master Device now sends the weights 280, local connectivity patterns (i.e. the devices executing the incoming nodes 213 and the outgoing nodes 214 for the current node), and the activation function 230 for each node 210 of the neural network to the Slave Device 420 responsible for it. The communication might be using remote wireless technology in the preferred implementation. The Master Device 410 also sends the inputs of the neural network 220 to the embedded devices 100 executing the computation of the input nodes of the neural network 250.

Figure 5D:
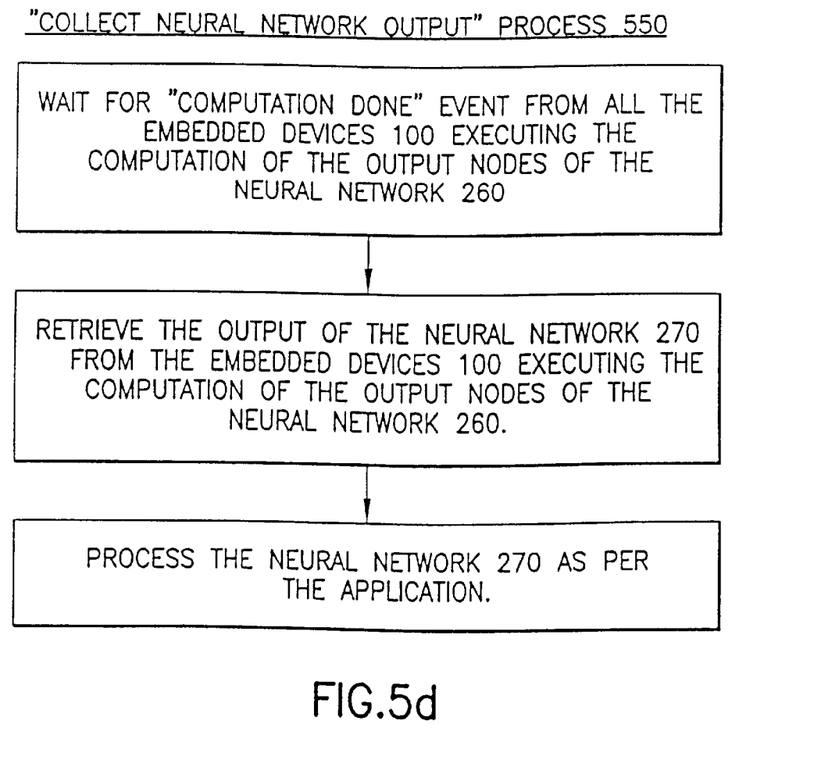
FIG. 5(d) is a flowchart showing the 'Collect Neural Network output' process executing on the Master Device.

FIG. 5(d) shows a flowchart of the 'Collect Neural Network Output' process 550 executing on the Master Device 410. This process waits for a 'computation done' event message from all the embedded devices executing the computation of the output nodes of the neural network. The Master Device 210 retrieves the output of the neural network 270 from these event messages and processes the output 270 as per the application.

Figure 6:
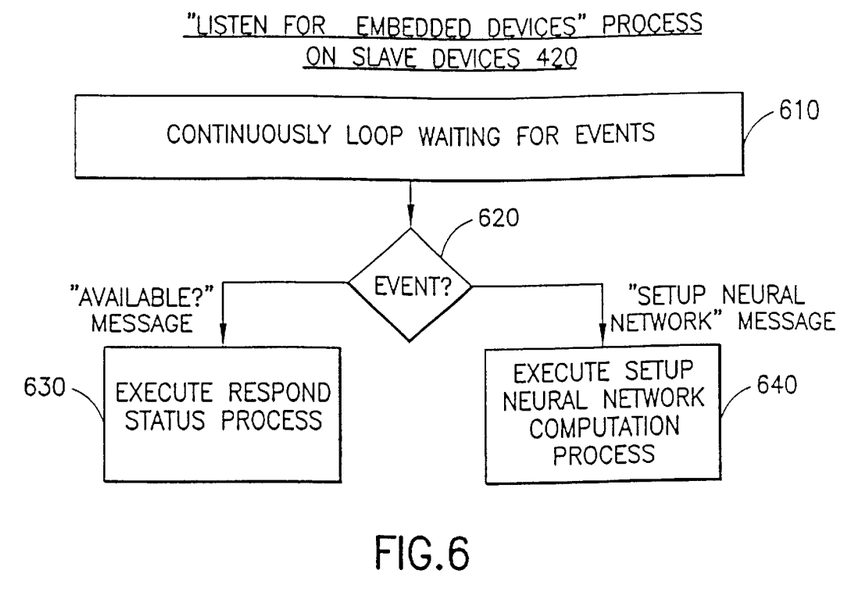
FIG. 6 is a flowchart showing the 'Listen for Embedded Devices' process executing on all the slave devices.

FIG. 6 shows a flowchart describing the 'Listen for Embedded Devices' process 600 executing on all embedded devices 100 which wish to participate in networked computation (i.e. slave devices 420). The 'Listen for Embedded Devices' process 600 continuously loops waiting for events. If the slave device 420 receives an 'available?' query message, it executes a 'respond status' process 630. If the slave device 420 receives a 'set up Neural Network Computation' message, it executes a 'Set up Neural Network Computation' process 640.

Figure 6A:
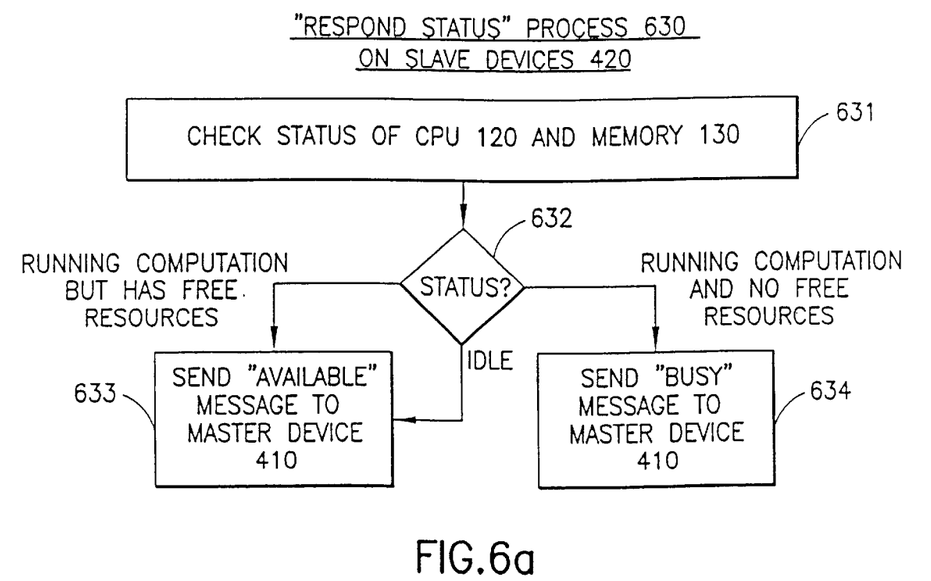
FIG. 6(a) is a flowchart showing the 'Respond Status' process executing on all the slave devices.

FIG. 6(a) shows a flowchart describing the 'Respond Status' process 630 executing on slave devices 420. The slave device checks the status of its CPU 120 and memory 130. If the slave device is either idle, or executing some computation, but not utilizing all of its CPU and memory, it sends an 'available' message to the Master Device 410. If the slave device is utilizing all of its CPU and memory in some computation, it sends a 'busy' message to the Master Device 410.

Figure 6B:
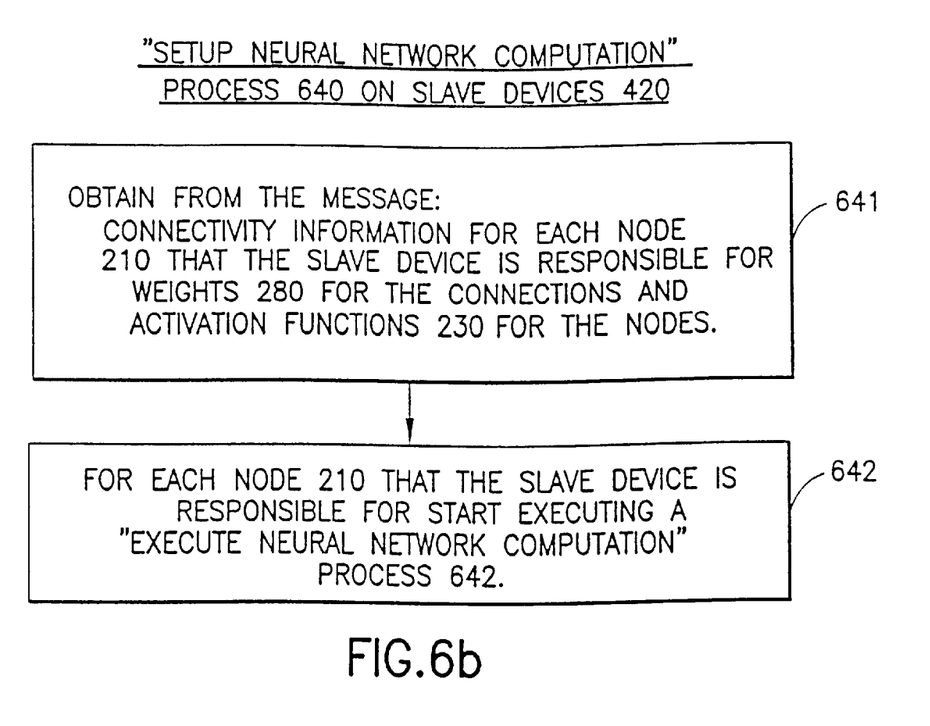
FIG. 6(b) is a flowchart showing the 'Setup Neural Network Computation' process executing on all the slave devices.

FIG. 6(b) shows a flowchart describing the 'Setup Neural Network Computation' process 640 executing on slave devices 420. The slave device 420 retrieves the following from the 'setup neural network' message: connectivity information for each node 210 that the slave device is responsible for (the identity of embedded devices executing the incoming nodes 213 and the outgoing nodes 214 for each node), the weights 280 for all the connections for each node that the slave device is responsible for, and the activation functions 230 for all the nodes that the slave device is responsible for. The slave device 420 then starts an 'Execute Neural Network Computation' process 642 that waits for all the activations 240 to arrive for each node 210 that the slave device is responsible for and then computes the activations for those nodes.

Figure 6C:
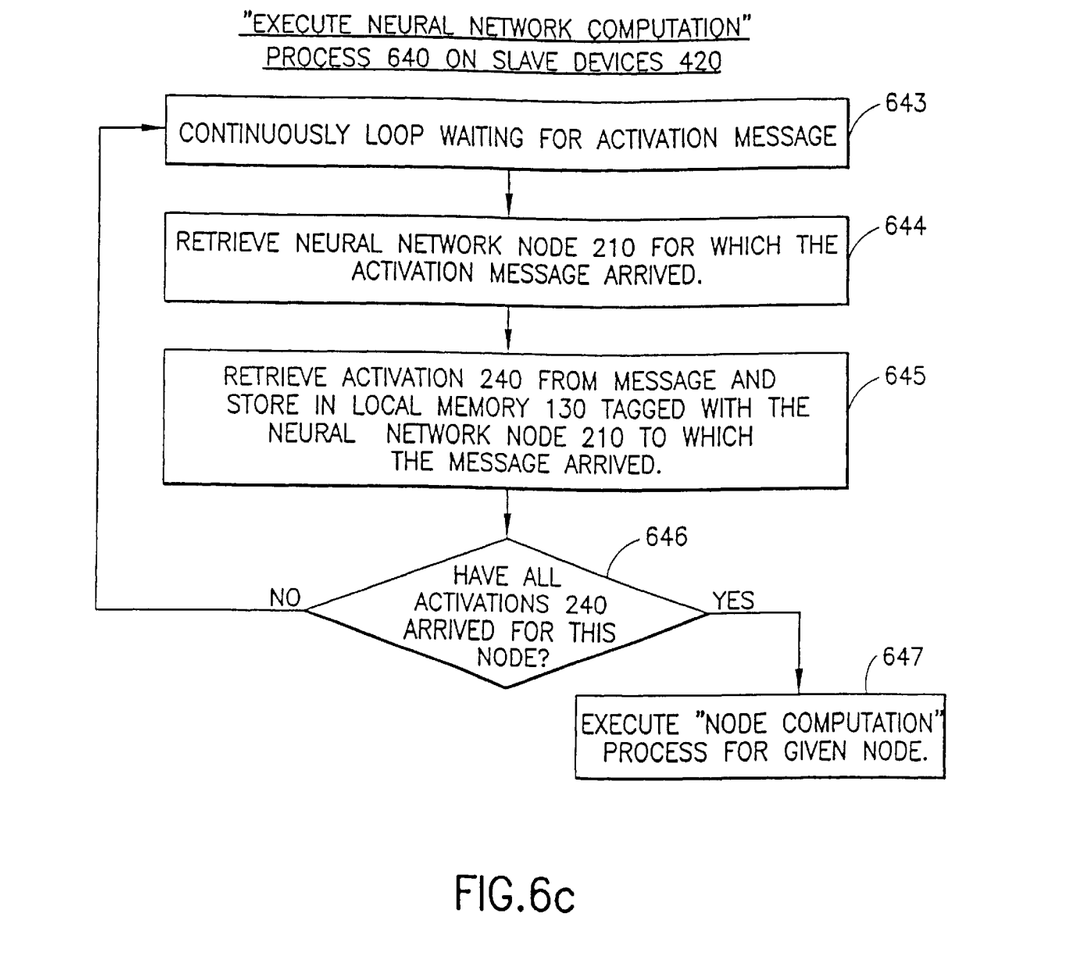
FIG. 6(c) is a flowchart showing the 'Execute Neural Network Computation' process executing on all the slave devices.

FIG. 6(c) shows a flowchart describing the 'Execute Neural Network Computation' process 642 executing on each slave device 420. The slave device 420 continuously loops waiting for activation messages from other slave devices executing the computation of the incoming nodes 213 of the current node. When an activation message arrives, the slave device 420 retrieves the activation 640 and the neural network node 210 for which the activation message arrived, and stores these in local memory 130. The slave device 420 checks to see if the activations from all the starting nodes 281 connecting to the current node have arrived. If so, the slave device executes the 'Node Computation' process 647 for the current node 210. If all the activations 240 have not arrived for the current node, the process continues looping waiting for more activation messages.

Figure 6D:
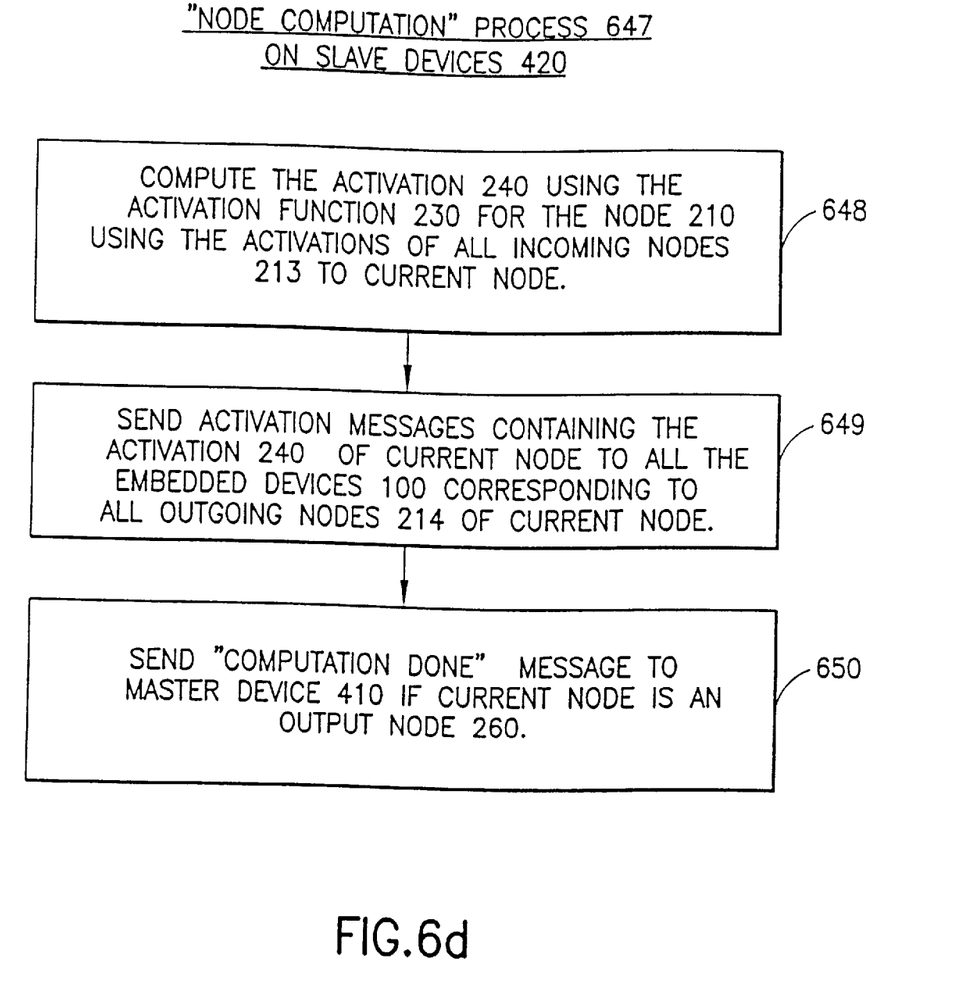
FIG. 6(d) is a flowchart showing the 'Node Computation' process executing on all the slave devices.

FIG. 6(d) shows a flowchart describing the 'Node Computation' process 647 executing on slave devices 420. The slave device computes the activation 240 of the current node, using the activation function 230 and the activations 240 of all the incoming nodes 213 to the current node. The slave device then sends activation messages to all the slave devices 420 that are executing the computation of the outgoing nodes 214 of the current node. If the current node is an output node 250 of the neural network, the slave device sends a 'Computation Done' message to the master device 410.

We claim:

1. An master embedded device having one or more memories and one or more computing sections, further comprising:

a communication section that communicates signals to and from one or more slave embedded devices;

an availability process that periodically identifies one or more of the slave embedded devices as available embedded devices being slave embedded devices that are able to communicate with the master embedded device and to perform a neural network computation;

a mapping process that periodically maps one or more nodes of a neural network on to each of the available embedded devices;

a starting process that periodically sends a message to all of the mapped available devices to start their respective neural network computation; and a collection process that collects an output of the neural network.

2. A master embedded device, as in claim 1, where the communication section comprises any one or more of the following: a wireless connection, a cellular telephony connection, an infrared connection, a coaxial cable connection, a fiber optic connection, a microwave connection, and a satellite communication connection.

3. A master embedded device, as in claim 1, where the device is embedded within any one or more of the following: a digital cellular telephone, a hand-held device, a digital watch, a personal digital assistant, a calculator, a pen, a household appliance, a television set, a radio, a computer, a cable television box, a toaster, and a microwave oven.

4. A master embedded device, as in claim 1, where:

A. the availability process comprises the steps of:
   developing a list of unresponsive available embedded devices, a list of currently available embedded devices, and a list of newly available embedded devices; and B. the mapping process comprises the steps of:
   determining a number of the nodes that are mapped to the unresponsive available embedded devices, being unassigned nodes;
   comparing the number of unassigned nodes to the number of newly available devices;
   assigning each unassigned node to a newly available device if the number of unassigned nodes is less than or equal to the number of newly available devices; and
   assigning one or more unassigned nodes to each of the newly available embedded devices and to zero or more of the currently available embedded devices if the number of unassigned nodes is greater than the number of newly available devices.

5. A master embedded device, as in claim 1, where the starting process comprises the following steps:
for each slave embedded device corresponding to one of the nodes, sending a weight for each connection to the node, an incoming identity of the slave embedded devices performing the network calculation of one or more respective incoming nodes, an outgoing identity of the slave embedded devices performing the network calculation of one or more respective outgoing nodes, and an activation function for the node; and
sending the inputs to the neural network to the slave embedded devices corresponding to one or more input nodes.

6. A master embedded device, as in claim 1, where collection process comprises the following steps:
waiting for a "computation done" message from all of the slave embedded devices, being output devices, that correspond to one or more output nodes of the neural network; and
retrieving the output from all of the output devices.

7. A slave embedded device having one or more memories and one or more computing sections, further comprising:
a communication section that communicates signals to and from one or more master embedded devices and one or more other slave devices;
a looping process that waits for event messages communicated from one or more of the master embedded devices;
a response status process executed after receiving a "available" event message; and
a neural network set up process executed after receiving a "setup" event message.

8. A slave embedded device, as in claim 7, where the communication section comprises any one or more of the following: a wireless connection, a cellular telephony connection, an infrared connection, a coaxial cable connection, a fiber optic connection, a microwave connection, and a satellite communication connection.

9. A slave embedded device, as in claim 7, where the device is embedded within any one or more of the following: a digital cellular telephone, a hand-held device, a digital watch, a personal digital assistant, a calculator, a pen, a household appliance, a television set, a radio, a computer, a cable television box, a toaster, and a microwave oven.

10. A slave embedded device, as in claim 7, where the response status process comprises the steps of:
checking the status of the computing sections and the memory;
sending an "available" message to the master embedded device if the memory and computing section have adequate free resources; and
sending a "busy" message to the master embedded device if the memory and computing section have no adequate free resources.

11. A slave embedded device, as in claim 7, where the neural network set up process comprises the steps of:
A. extracting from the "setup" event message one or more nodes to which the slave embedded device is mapped;
for each of the mapped nodes, extracting from the "setup" event message the following: a weight for each connection to the nodes to which the respective mapped node is connected, an incoming identity of the slave embedded devices performing the network calculation of one or more respective incoming nodes, an outgoing identity of the slave embedded devices performing the network calculation of one or more respective outgoing nodes, and an activation function for the mapped node; and
B. executing a neural network process comprising the following steps:
waiting for activation messages from incoming nodes;
after receiving an activation message, retrieving an activation and a destination node identity for which the activation message is intended; and
checking that all the activations have arrived for each destination node; and
executing a node computation process for each destination node for which all activations have arrived.

12. A slave embedded device, as in claim 11, where the node computation process comprises the steps of:
computing an activation using the activation function and all the activations received from incoming nodes, sending an activation message containing the computed activation to all the slave embedded devices corresponding to the output nodes of the node; and
sending a "computation done" message to the master embedded device if the node is an output node of the neural network.

13. A neural network comprising:
A. one or more slaves embedded device having one or more memories and one or more computing sections, further comprising:
a slave communication section that communicates signals to one or more other slave devices and one or more master devices;
a looping process that waits for event messages;
a response status process executed after receiving a "available" event message; and
a neural network set up process executed after receiving a "setup" event message;
B. one or more master embedded devices having one or more memories and one or more computing sections, further comprising:
a master communication section that communicates signals to and from one or more of the slave embedded devices;
an availability process that periodically identifies one or more of the slave embedded devices as available embedded devices being slave embedded devices that are able to communicate with the master embedded device and to perform a neural network computation;
a mapping process that periodically maps one or more node of a neural network on to each of the available embedded devices;
a starting process that periodically sends a message to all of the mapped available devices to start their respective neural network computation; and
a collection process that collects an output of the neural network.

14. A neural network, as in claim 13, used for any one or more of the following: recognizing phonemes of human speech, recognizing handwritten letters of an alphabet, recognizing identity of human faces, and processing natural language text.

15. A master embedded device neural network process comprising the steps of:
periodically identifying one or more of the slave embedded devices as available embedded devices being slave embedded devices that are able to communicate with the master embedded device and to perform a neural network computation;

periodically mapping one or more node of a neural network on to each of the available embedded devices;

periodically sending a message to all of the mapped available devices to start their respective neural network computation; and collecting an output of the neural network.

16. A master embedded device neural network system comprising:

means for periodically identifying one or more of the slave embedded devices as available embedded devices being slave embedded devices that are able to communicate with the master embedded device and to perform a neural network computation;

means for periodically mapping one or more node of a neural network on to each of the available embedded devices;

means for periodically sending a message to all of the mapped available devices to start their respective neural network computation; and means for collecting an output of the neural network.

17. A computer program product for a master embedded device which performs the steps of:

periodically identifying one or more of the slave embedded devices as available embedded devices being slave embedded devices that are able to communicate with the master embedded device and to perform a neural network computation;

periodically mapping one or more node of a neural network on to each of the available embedded devices;

periodically sending a message to all of the mapped available devices to start their respective neural network computation; and collecting an output of the neural network.

18. A slave embedded device process comprising the steps of:

communicating signals to and from one or more master embedded devices and one or more other slave devices;

looping that waits for event messages communicated from one or more of the master embedded devices;

responding status after receiving a "available" event message; and setting up a neural network after receiving a "setup" event message.

19. A slave embedded device having one or more memories and one or more computing sections, further comprising:

means for communicating signals to and from one or more master embedded devices and one or more other slave devices;

means for looping that waits for event messages communicated from one or more of the master embedded devices;

means for responding status after receiving a "available" event message; and means for setting up a neural network after receiving a "setup" event message.

20. A computer program product for a slave embedded device which performs the steps of:

communicating signals to and from one or more master embedded devices and one or more other slave devices;

looping that waits for event messages communicated from one or more of the master embedded devices;

responding status after receiving a "available" event message; and setting up a neural network after receiving a "setup" event message.

* * * * *